Oct. 13, 1936.    A. C. LINDGREN    2,057,649
AUXILIARY POWER DEVICE FOR TRACTORS
Filed April 27, 1934    2 Sheets-Sheet 1
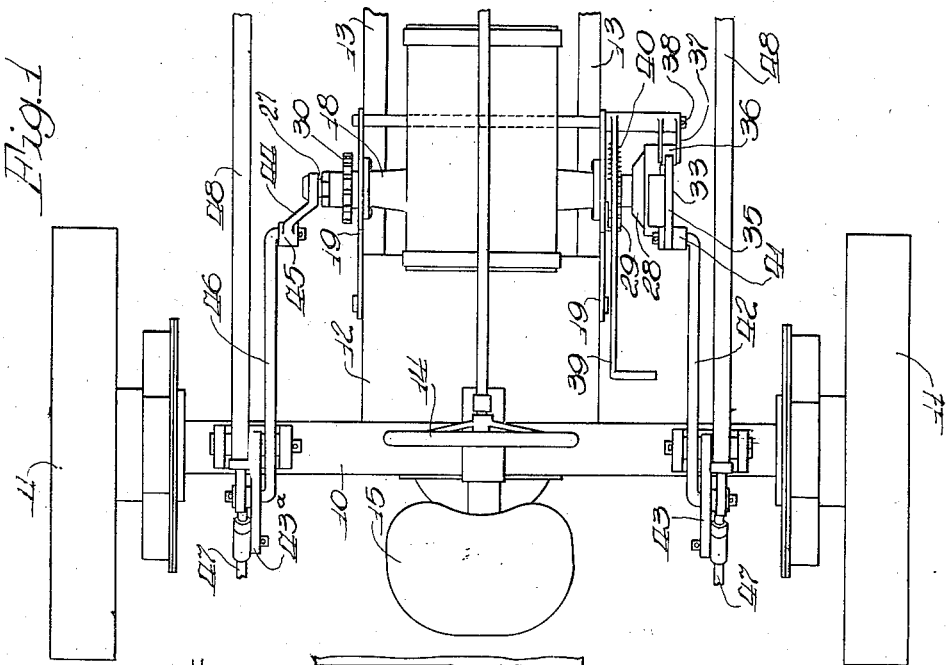
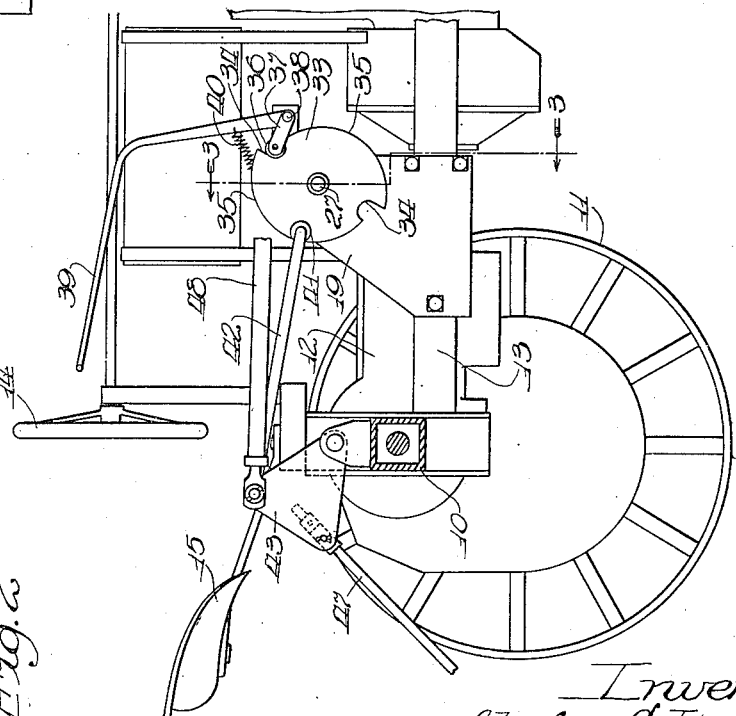
Inventor
Alexius C. Lindgren
By V. F. Lassague
Atty.

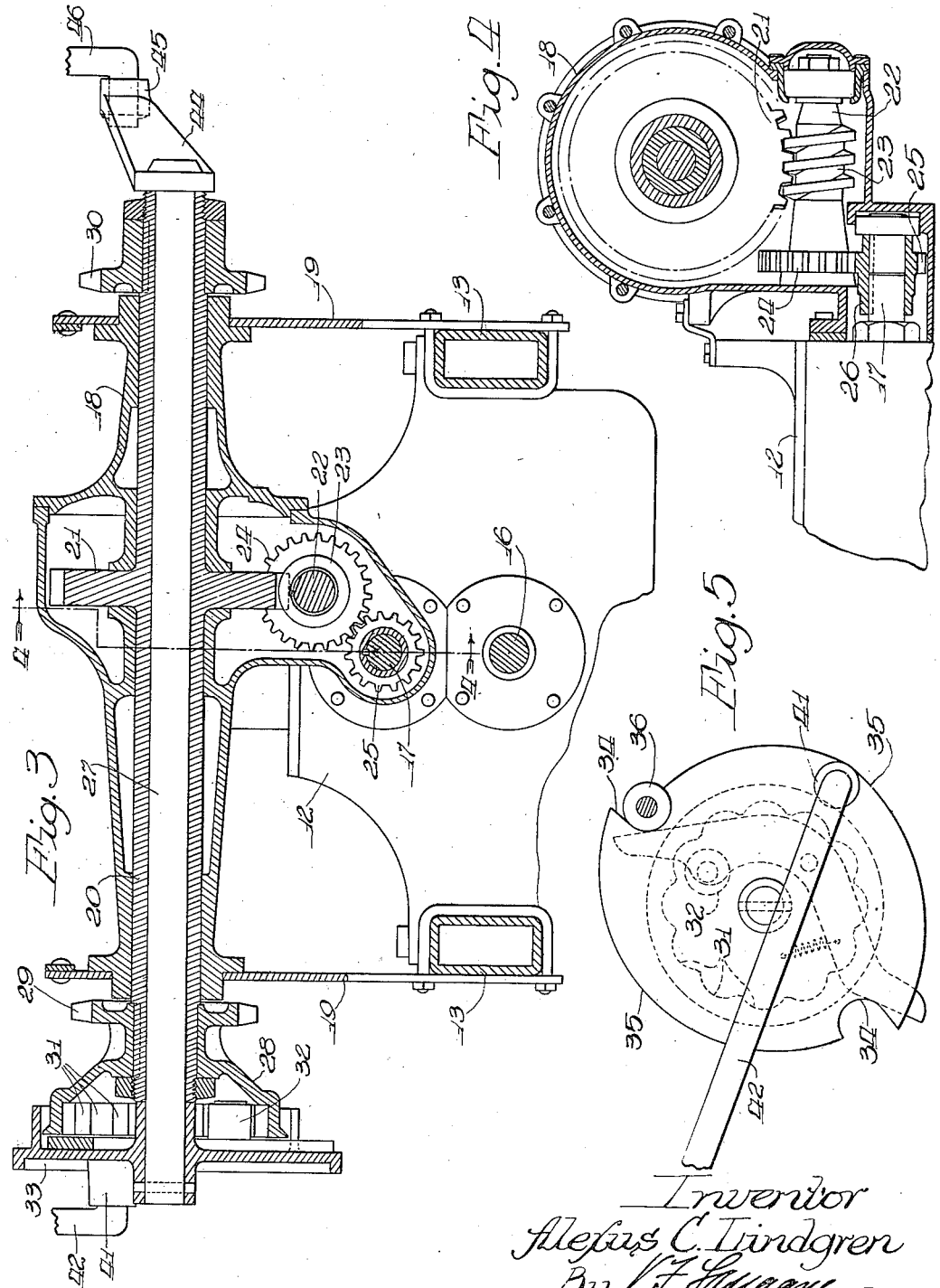

Patented Oct. 13, 1936

2,057,649

UNITED STATES PATENT OFFICE 2,057,649

AUXILIARY POWER DEVICE FOR TRACTORS

Alexus C. Lindgren, Chicago, Ill., assignor to International Harvester Company, a corporation of New Jersey Application April 27, 1934, Serial No. 722,661

19 Claims. (Cl. 97—50)

The present invention relates to auxiliary power devices for tractors, and more particularly to engine driven mechanism for driving and adjusting implements mounted on, or connected to, the tractor.

The main object of the invention is to provide a simple and compact form of power lift mechanism and locate it on the tractor where it will not interfere with vertical movements of any implement that may be close coupled to the tractor at the rear, as may occur with rearwardly positioned lifts, and where it is conveniently available for operation of the lifting connections of implements at the front and rear of the tractor.

Further objects are to provide for connections to the lift device on both sides of the tractor and to embody in the device driving means for certain implements such as planters, etc.

The foregoing, as well as other objects which will appear from the description to follow, are attained by the construction and arrangement of parts hereinafter disclosed and claimed, and illustrated by the accompanying drawings, where, Figure 1 is a plan view showing the rear portion of a tractor with the auxiliary power device in position thereon;

Figure 2 is a side view of Figure 1;

Figure 3 is an enlarged transverse sectional view on the line 3—3 of Figure 2;

Figure 4 is a detailed sectional view on the line 4—4 of Figure 3; and

Figure 5 is a detailed side view of the clutch mechanism seen in section in Figure 3.

For the purposes of this disclosure, the invention has been illustrated in connection with the rear portion of a row crop tractor having a rear axle structure 10 of the wide tread type, supported on traction wheels 11. The tractor body comprises a transmission housing 12 centrally secured to the axle structure and forwardly extending side frame members 13 which support the engine and other parts of the tractor. The side members are carried at the front on suitable steering wheels, not shown, which are controlled by the usual hand wheel 14 adjacent the operator's seat 15. As shown by Figure 3, the propeller shaft enters the forward wall of the transmission housing at 16, and a driven shaft within the transmission housing is projected from the forward wall of the transmission casing, as at 17, to provide an external drive connection or power take-off driven from the propeller shaft.

The structure embodying the invention comprises a transverse tubular housing 18 which extends across the mid portion of the tractor body forward of the transmission housing and has its ends supported in upright brackets 19 which are bolted, or otherwise secured, at their lower ends to the side members 13. The tubular housing 18 is formed internally to provide bearings for a rotatable outer tubular shaft 20, which extends beyond the ends of the housing 18 at each side of the tractor body.

The housing 18 is enlarged at its central portion to enclose a worm gear wheel 21 which is secured on the tubular shaft 20. Below the gear 21, an extension of the housing 18 encloses a stub shaft 22 formed with a worm pinion 23 in mesh with the worm gear 21 and also having secured thereto a spur gear 24 which is in mesh with a pinion 25 on a coupling sleeve 26 keyed to the power take-off shaft 17.

The outer tubular shaft 20 has journaled within it an inner shaft 27 with its ends projecting beyond the shaft 20 at each end thereof. The tubular shaft 20 is constantly driven from the power take-off shaft 17 through the gear train above described, and the inner concentric shaft 27 is intermittently driven by the shaft 20 through half revolution clutch mechanism, which will now be described.

On one of the projected ends of the tubular shaft 20, in this instance at the right side of the tractor, there is secured the bell shaped portion 28 of a half revolution clutch of the well known pawl and ratchet type. In the present instance, the clutch member 28 is shown as comprising an inwardly extended sleeve formed with a sprocket gear 29, and a corresponding sprocket gear 30 is fixed to the opposite end of the shaft 20. These sprocket gears 29 and 30 are preferably provided to afford a source of power for driven mechanism such as seed or fertilizer dispensing devices that may be mounted on the tractor. The peripheral flange of the clutch member 28 is formed with the usual pawl seats or notches 31 on its inner side which are adapted to be engaged by the clutch roller 32 carried on the usual spring-pressed pawl, seen in dotted lines in Figure 5, which is pivoted on the intermittently rotated member of the clutch. This member 33 is of disk-like form and is secured to the projecting end of the inner shaft 27 in complemental relation to clutch member 28. The periphery of the driven clutch member 33 is formed with the usual opposite clutch throwout seats 34 connected by the opposite tracks 35 for the clutch tripping element or roller 36. The clutch pawl is controlled by the usual trip arms seen in Figure 5, the ends of which are presented in the throwout seats 34.

The trip roller 36 is carried on the end of a trip arm 37 formed on a sleeve 38 rockable on a cross shaft carried in the brackets 19 in parallel relation to the transverse housing 18. The trip arm 37 is controlled by the upwardly and rearwardly extending trip lever 39 which is normally drawn rearwardly by a spring 40 to retain the trip arm and roller in one of the seats 34 or in contact with the peripheral tracks 35. Upon forward rocking movement of the lever 39 and sleeve 38 the throw-out roller 36 will release the clutch pawl and permit the clutch to engage. The roller 36 will, upon release of lever 39, ride on the peripheral track 35 of the clutch member 33 until the roller 36 engages in the opposite throwout seat 34, thus disconnecting the driven member of the clutch at the completion of its cycle of operation, or half revolution. As the driven member 33 of the clutch is fixed to the inner shaft 27, this shaft will have corresponding movement.

In order to utilize the intermittent half revolutions of shaft 27 in a manner to impart lifting and lowering movement to any implement that may be connected at either the front or rear of the tractor, the driven clutch member 33 on one end of shaft 27 is formed with an opening surrounded by a boss 41 providing a pivot bearing for the forward angularly bent end of a lifting link 42 which extends rearwardly and is pivotally connected at its rear end to a fore and aft rockable member or lever 43 mounted on the rear axle structure of the tractor. The opposite end of the shaft 27 has secured thereto a crank arm 44 formed with a bearing sleeve 45 on its outer end which provides a bearing for the forward angularly bent end of a second or duplicate lifting link 46 extending rearwardly in parallel relation to the similar link 42 at the other side of the tractor and likewise connected to a rocking member 43ª, similar in all respects to the rocking member 43. The fore and aft rocking members 43 and 43ª are provided with suitable means for pivotal connection thereto of downwardly and rearwardly extending lift rods 47 adapted for connection to rearwardly positioned tractor-attached implements, and with forwardly extending lift rods 48 adapted for connection to forwardly attached implements. Obviously, either the front or rear lifting rods may be used separately or both may be used simultaneously.

With the construction above described, the tractor is provided with an auxiliary power driven device characterized by the concentric shafts extending at opposite sides of the tractor body and affording a source of constant drive power as well as a source of intermittent power. It will be clear that the intermittently-driven shaft 27 will be given a half revolution upon each actuation of the clutch mechanism and that alternate actuations will serve to rock the members 43 and 43ª first forwardly and then rearwardly or vice versa. It will also be seen from the disclosure that this rocking movement of the said members is made readily available for the lifting and lowering of any implements, such as plows, cultivators, etc., as may be connected to either or both the front or rear of the tractor.

The preferred embodiment of the invention above described is illustrative of the invention, the scope of which is defined in the following claims.

What is claimed is:

1. The combination with a tractor having a transmission housing located forwardly of the rear axle structure of the tractor and a power take-off shaft projecting through the forward wall of said housing, of a power lift mechanism mounted on the tractor forward of the transmission housing comprising a rotatably mounted tubular shaft extending across the tractor body, a gear secured to the central portion of the tubular shaft, a driving connection between said gear and the projecting end of the power take-off shaft, an inner shaft journaled within the tubular shaft and projecting beyond it at each end, a half revolution clutch having its driving member secured to one end of the tubular shaft and its driven member secured to the adjacent end of the inner shaft, and lifting links eccentrically connected to the respective ends of the inner shaft.

2. The combination with a tractor having a transmission including a power take-off shaft, of a power lift mechanism comprising a rotatably mounted tubular shaft extending across the tractor body, a driving connection between said shaft and the power take-off shaft, an inner shaft journaled within the tubular shaft and projecting beyond it at each end, a half revolution clutch having its driving member secured to one end of the tubular shaft and its driven member secured to the adjacent end of the inner shaft, lifting links, and means connecting the lifting links to the respective ends of the inner shaft for reciprocating the aforesaid links.

3. The combination with a tractor having a body portion including side members, of a combined drive shaft and power lift mechanism comprising a transverse tubular housing located in the mid-portion of the tractor body and supported at each end on the side members, inner and outer concentric shafts journaled in said housing and projecting beyond it at each end, means for constantly driving the outer shaft by engine power, means on said shaft for utilizing it as an implement driving shaft, trip controlled means for intermittently driving the inner shaft in unison with the outer shaft, lifting links, and means connected to both ends of the inner shaft for reciprocating the aforesaid links.

4. The combination with a tractor having a body portion including side members, of power lift mechanism comprising a transverse tubular housing located in the mid-portion of the tractor body and supported at each end on the side members, inner and outer concentric shafts journaled in said housing and projecting beyond it at each end, means for constantly driving the outer shaft by engine power, trip controlled means for intermittently driving the inner shaft in unison with the outer shaft, fore and aft rockable implement controlling means mounted on the tractor, and lifting links pivotally connected to said implement controlling means and eccentrically connected to the inner shaft at each end thereof.

5. The combination with a tractor having a body portion including side members, of power lift mechanism comprising a transverse tubular housing supported at each end on the side members, inner and outer concentric shafts journaled in said housing and projecting beyond it at each end, means for constantly driving one of said shafts by engine power, trip controlled means for intermittently driving the second shaft in unison with the other, and lifting links eccentrically connected to both ends of the intermittently driven shaft.

6. The combination with a tractor having a motor, a transmission and a propeller shaft, of a power lift mechanism comprising a rotatably mounted tubular shaft, bearing means for supporting said tubular shaft, means for driving said tubular shaft from said propeller shaft, an inner shaft journaled within the tubular shaft and projecting beyond it at each end, clutch means having its driving member secured to one end of the tubular shaft and its driven member secured to the adjacent end of the inner shaft, and means for operating said clutch means to throw said clutch means in and out of operating position.

7. The combination with a tractor having a motor, a transmission and a propeller shaft, of a power lift mechanism comprising a rotatably mounted tubular shaft, bearing means for supporting said tubular shaft, means for driving said tubular shaft from said propeller shaft, an inner shaft journaled within the tubular shaft and projecting beyond it at each end, clutch means of the one-half revolution type having its driving member secured to one end of the tubular shaft and its driven member secured to the adjacent end of the inner shaft, and means for operating said clutch means to throw said clutch means in and out of operating position.

8. The combination with a tractor having a wheeled frame, a motor, a transmission and a propeller shaft, of a power lift mechanism comprising a rotatably mounted tubular shaft, means for driving said tubular shaft from said propeller shaft, an inner shaft journaled within the tubular shaft and projecting beyond it at each end, clutch means having its driving member secured to one end of the tubular shaft and its driven member secured to the adjacent end of the inner shaft, means for operating said clutch means to throw said clutch means in and out of operating position, and means for supporting said power lift mechanism laterally on said wheeled frame.

9. The combination with a tractor having a body portion including side members, of power lift mechanism comprising inner and outer concentric shafts, laterally spaced means for journaling said outer shaft on the side members, means for constantly driving one of said shafts by engine power, trip controlled means for intermittently driving the second shaft in unison with the other, and lifting links eccentrically connected to both ends of the intermittently driven shaft.

10. The combination with a tractor having a motor, a transmission and a propeller shaft, of a power lift mechanism comprising a rotatably mounted tubular shaft, bearing means for supporting said tubular shaft, means for constantly driving said tubular shaft from said propeller shaft, an inner shaft journaled within the tubular shaft and projecting beyond it at each end, trip controlled means for intermittently driving the inner shaft in unison with the outer shaft, fore and aft oscillating implement controlling means mounted on the tractor, and means connected to said inner shaft and to said implement controlling means for oscillating the aforesaid controlling means.

11. The combination with a tractor having a motor, a transmission and a propeller shaft, of a power lift mechanism comprising a rotatably mounted tubular shaft, bearing means for supporting said tubular shaft, means for driving said tubular shaft from said propeller shaft, an inner shaft journaled within the tubular shaft and projecting beyond it at each end, clutch means having its driving member secured to one end of the tubular shaft and its driven member secured to the adjacent end of the inner shaft, eccentric crank means mounted on said inner shaft at opposite ends thereof, and means for operating said clutch means to throw said clutch means in and out of operating position.

12. The combination with a tractor having a motor, a transmission and a propeller shaft, of a power lift mechanism comprising a rotatably mounted tubular shaft, bearing means for supporting said tubular shaft, driven means mounted on said tubular shaft between its ends for driving the aforesaid shaft, means for driving said driven means on the aforesaid tubular shaft from said propeller shaft, an inner shaft journaled within the tubular shaft and projecting beyond it at each end, clutch means having its driving member secured to an end of the tubular shaft and its driven member secured to the adjacent end of the inner shaft, and means for operating said clutch means to throw said clutch means in and out of operating position.

13. The combination with a tractor having a motor, a transmission and a propeller shaft, of a power lift mechanism comprising a rotatably mounted tubular shaft, bearing means laterally positioned on the tractor for supporting said tubular shaft, means for supporting said bearing means, an inner shaft journaled within the tubular shaft and projecting beyond it at each end, clutch means having its driving member secured to one end of the tubular shaft and its driven member secured to the adjacent end of the inner shaft, and means for operating said clutch means to throw said clutch means in and out of operating position.

14. A power lift attachment for a tractor having a wheeled frame, a motor, a transmission and a propeller shaft, comprising a transverse housing, a rotatably mounted tubular shaft extending laterally across the tractor body and journaled within said transverse housing, means for driving said tubular shaft from said propeller shaft, an inner shaft journaled within the tubular shaft and projecting beyond it at each end, clutch means having its driving member secured to one end of the tubular shaft and its driven member secured to the adjacent end of the inner shaft, lifting cranks secured to said inner shaft, and means for mounting said power lift attachment on said tractor.

15. A power lift attachment for a tractor having a wheeled frame, a motor, a transmission and a power take-off shaft, comprising a laterally extending rotatably mounted tubular shaft, bearing means for rotatably mounting said tubular shaft, means for mounting said bearing means on said tractor, means for driving said tubular shaft from said power take-off shaft, an inner shaft journaled within the tubular shaft and projecting beyond it at each end, clutch means having its driving member secured to one end of the tubular shaft and its driven member secured to the adjacent end of the inner shaft, lifting cranks secured to said inner shaft, and means for operating said clutch means to throw said clutch means in and out of operating position.

16. A power lift attachment for a tractor having a wheeled frame, a motor, a transmission, a propeller shaft and a power take-off shaft extending forward of said transmission and located above the propeller shaft, comprising a transverse housing, a rotatably mounted tubular shaft extending laterally across the tractor frame and journaled within said transverse housing, means for driving said tubular shaft from said propeller shaft, said means comprising gear means secured to said transverse tubular shaft and gear reduction means connecting said gear means on said transverse shaft to said power take-off shaft, means for laterally supporting said transverse shaft, and additional supporting and housing means for said gear reduction means.

17. A power lift attachment for a tractor having a wheeled frame, a motor, a transmission and a propeller shaft, comprising a rotatably mounted tubular shaft, bearing means for supporting said tubular shaft, means for driving said tubular shaft from said propeller shaft, an inner shaft journaled within the tubular shaft and projecting beyond it at each end, clutch means of the one-half revolution type having its driving member secured to one end of the tubular shaft and its driven member secured to the adjacent end of the inner shaft, lifting cranks secured to said inner shaft, and means for mounting said power lift attachment on said tractor.

18. A power lift attachment for a tractor having a wheeled frame and a motor, comprising a rotatably mounted tubular shaft extending laterally across the tractor body, bearing means for supporting said tubular shaft, means on said tubular shaft for using it as an implement driving shaft, means for constantly driving said tubular shaft from the motor, clutch means having its driving member secured to one end of the tubular shaft and its driven member secured to the adjacent end of the inner shaft, trip controlled means for intermittently driving the inner shaft in unison with the outer shaft, lifting links, means connected to both ends of the inner shaft for reciprocating the aforesaid links, and means for mounting said power lift attachment on said tractor.

19. A power lift attachment for a tractor having a wheeled frame and a motor, comprising a rotatably mounted tubular shaft extending laterally across the tractor body, bearing means for supporting said tubular shaft, means for constantly driving said tubular shaft from the motor, clutch means of the one-half revolution type having its driving member secured to one end of the tubular shaft and its driven member secured to the adjacent end of the inner shaft, trip controlled means for intermittently driving the inner shaft in unison with the outer shaft, lifting links, means connected to both ends of the inner shaft for reciprocating the aforesaid links, and means for mounting said power lift attachment on said tractor.

ALEXUS C. LINDGREN.